(12) United States Patent
Keller et al.

(10) Patent No.: US 7,991,928 B2
(45) Date of Patent: *Aug. 2, 2011

(54) RETRY MECHANISM

(75) Inventors: James B. Keller, Redwood City, CA (US); Sridhar P. Subramanian, Cupertino, CA (US); Ramesh Gunna, San Jose, CA (US)

(73) Assignee: Apple Inc., Cupertino, CA (US)

( * ) Notice: Subject to any disclaimer, the term of this patent is extended or adjusted under 35 U.S.C. 154(b) by 159 days.

This patent is subject to a terminal disclaimer.

(21) Appl. No.: 12/408,410

(22) Filed: Mar. 20, 2009

(65) Prior Publication Data

US 2009/0177846 A1 Jul. 9, 2009

Related U.S. Application Data

(63) Continuation of application No. 11/282,037, filed on Nov. 17, 2005, now Pat. No. 7,529,866.

(51) Int. Cl.
*G06F 3/00* (2006.01)
*G06F 15/167* (2006.01)
(52) U.S. Cl. .......................... 710/52; 709/213
(58) Field of Classification Search ............... 710/52; 709/213
See application file for complete search history.

(56) References Cited

U.S. PATENT DOCUMENTS

| | | | | |
|---|---|---|---|---|
| 3,984,814 A * | 10/1976 | Bailey et al. | 714/16 |
| 4,845,614 A * | 7/1989 | Hanawa et al. | 714/16 |
| 5,592,631 A * | 1/1997 | Kelly et al. | 710/113 |
| 5,612,953 A * | 3/1997 | Olnowich | 370/367 |
| 5,790,813 A | 8/1998 | Wittaker | |
| 5,822,765 A | 10/1998 | Boatright et al. | |
| 5,884,052 A | 3/1999 | Chambers et al. | |
| 5,889,972 A | 3/1999 | Allingham | |
| 5,890,217 A * | 3/1999 | Kabemoto et al. | 711/141 |
| 5,943,483 A | 8/1999 | Solomon | |
| 6,148,359 A * | 11/2000 | Elkhoury et al. | 710/311 |
| 6,553,446 B1 * | 4/2003 | Miller | 710/307 |
| 6,557,068 B2 * | 4/2003 | Riley et al. | 710/306 |
| 6,691,191 B1 | 2/2004 | Kobayashi et al. | |
| 6,816,934 B2 * | 11/2004 | Riley et al. | 710/113 |
| 2002/0124145 A1 * | 9/2002 | Arimilli et al. | 711/146 |

* cited by examiner

*Primary Examiner* — Henry W Tsai
*Assistant Examiner* — Hyun Nam
(74) *Attorney, Agent, or Firm* — Lawrence J. Merkel; Meyertons, Hood, Kivlin, Kowert & Goetzel, P.C.

(57) ABSTRACT

An interface unit may comprise a buffer configured to store requests that are to be transmitted on an interconnect and a control unit coupled to the buffer. In one embodiment, the control unit is coupled to receive a retry response from the interconnect during a response phase of a first transaction for a first request stored in the buffer. The control unit is configured to record an identifier supplied on the interconnect with the retry response that identifies a second transaction that is in progress on the interconnect. The control unit is configured to inhibit reinitiation of the first transaction at least until detecting a second transmission of the identifier. In another embodiment, the control unit is configured to assert a retry response during a response phase of a first transaction responsive to a snoop hit of the first transaction on a first request stored in the buffer for which a second transaction is in progress on the interconnect. The control unit is further configured to provide an identifier of the second transaction with the retry response.

18 Claims, 3 Drawing Sheets

RETRY MECHANISM

This application is a continuation of U.S. patent application Ser. No. 11/282,037, filed on Nov. 17, 2005 now U.S. Pat. No. 7,529,866.

BACKGROUND

1. Field of the Invention

This invention is related to the field of processors, cache coherent communication among processors, and the use of retry in cache coherent communications.

2. Description of the Related Art

Processors are typically included in systems with other components and are configured to communicate with the other components via an interconnect on which the processor is designed to communicate. The other components may be directly connected to the interconnect, or may be indirectly connected through other components. For example, many systems include an input/output (I/O) bridge connecting I/O components to the interface.

Typically, the processor includes an interface unit designed to communicate on the interconnect on behalf of the processor core. The processor core generates requests to be transmitted on the interconnect, such as read and write requests to satisfy load and store operations and instruction fetch requests. Additionally, most processors implement caches to store recently fetched instructions/data, and implement cache coherency to ensure coherent access by processors and other components even though cached (and possible modified) copies of blocks of memory exist. Such processors receive coherency related requests from the interconnect (e.g. snoop requests to determine the state of a cache block and to cause a change in state of the cache block). Other components may also implement caching and/or cache coherent communication.

A problem arises in such systems when a given cache block is being shared by two or more processors or other devices, especially if memory latencies are long (which is typically the case). A first processor/device initiates a transaction to read the block, for example. Then, a second processor/device initiates a transaction to read the same block before the first processor/device receives the block from memory.

In some systems, the first processor/device responds to the second processor/device's transaction, indicating that it will provide the block (after it receives the block from memory). The second processor/device records a "link" to the first processor/device to remember that the first processor/device will be providing the data. If multiple devices make such requests, a linked list of promises to provide the data is formed. An inefficient amount of storage may be needed across the devices to store the linked list state. Additionally, ensuring that such a system functions properly without deadlock or loss of coherency is complicated.

In other systems, transactions can be "retried" to be reattempted at a later time. However, with long memory latencies and many devices attempting to share a block, a large number of transactions may be initiated, only to be retried. The same device may initiate its transaction repeatedly, only to be retried. Bandwidth consumed by such transactions is wasted, and power consumption may be increased as well even though no useful work occurs as a result of the retried transactions.

SUMMARY

In one embodiment, an interface unit comprises a buffer configured to store requests that are to be transmitted on an interconnect and a control unit coupled to the buffer. The control unit is also coupled to receive a retry response from the interconnect that is received during a response phase of a first transaction initiated on the interconnect for a first request stored in the buffer. The control unit is configured to record an identifier supplied on the interconnect with the retry response. The identifier identifies a second transaction that is in progress on the interconnect. The control unit is configured to inhibit reinitiation of the first transaction at least until detecting a second transmission of the identifier on the interconnect.

In another embodiment, an interface unit comprises a buffer configured to store requests that are to be transmitted on an interconnect; and a control unit coupled to the buffer. The control unit is configured to assert a retry response during a response phase of a first transaction on the interconnect responsive to a snoop hit of the first transaction on a first request stored in the buffer for which a second transaction is in progress on the interconnect. The control unit is further configured to provide an identifier of the second transaction with the retry response.

In yet another embodiment, a method comprises receiving a retry response from the interconnect during a response phase of a first transaction initiated on the interconnect for a first request; recording an identifier supplied on the interconnect with the retry response, wherein the identifier identifies a second transaction that is in progress on the interconnect; and inhibiting reinitiation of the first transaction at least until detecting a second transmission of the identifier on the interconnect.

BRIEF DESCRIPTION OF THE DRAWINGS

The following detailed description makes reference to the accompanying drawings, which are now briefly described.

Figure 1:
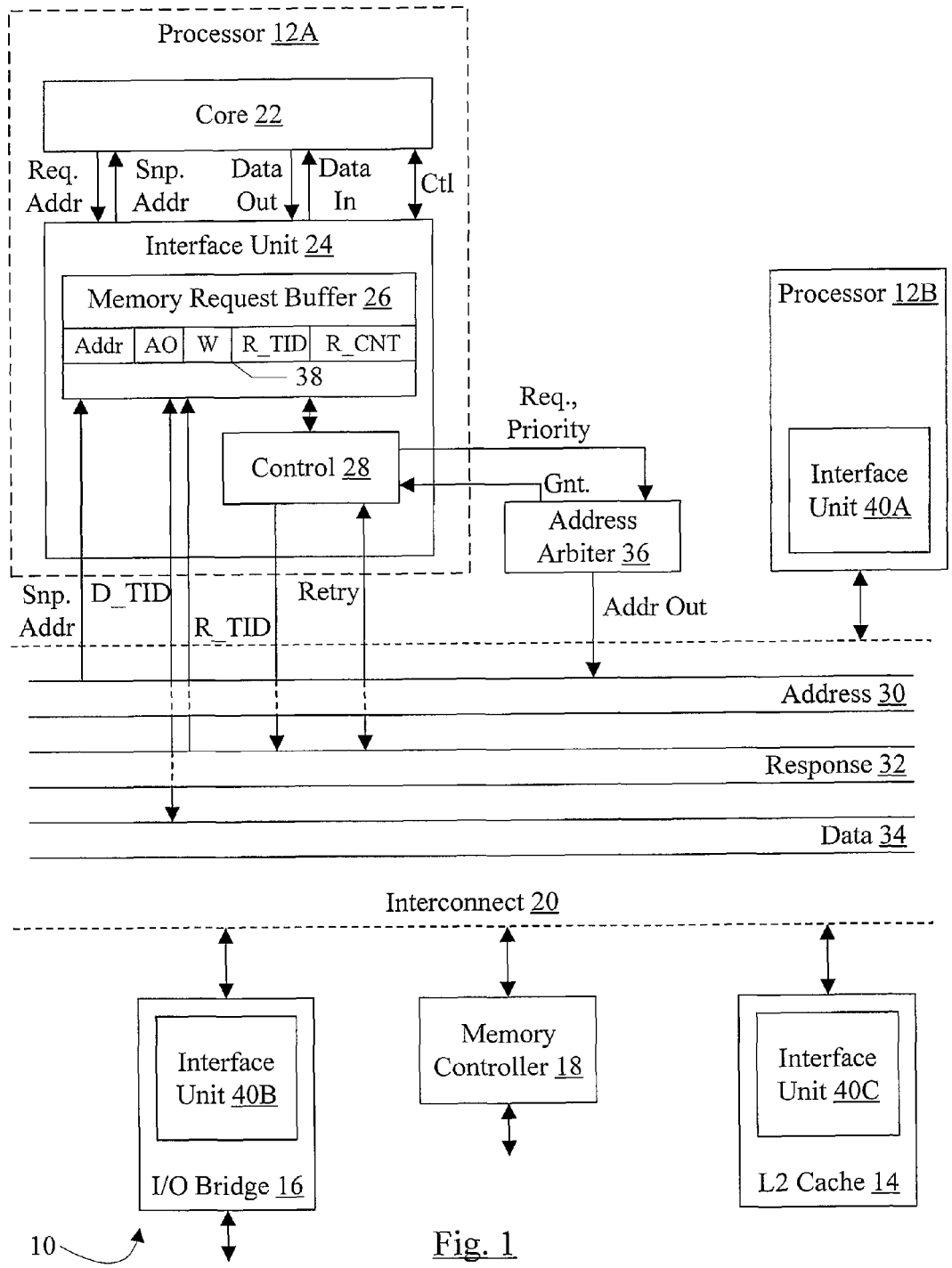
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the illustrated embodiment, the system 10 includes processors 12A-12B, a level 2 (L2) cache 14, an I/O bridge 16, a memory controller 18, and an interconnect 20. The processors 12A-12B, the L2 cache 14, the I/O bridge 16, and the memory controller 18 are coupled to the interconnect 20. While the illustrated embodiment includes two processors 12A-12B, other embodiments of the system 10 may include one processor or more than two processors.

Similarly, other embodiments may include more than one L2 cache 14, more than one I/O bridge 16, and/or more than one memory controller 18. In one embodiment, the system 10 may be integrated onto a single integrated circuit chip (e.g. a system on a chip configuration). In other embodiments, the system 10 may comprise two or more integrated circuit components coupled together via a circuit board. Any level of integration may be implemented in various embodiments.

The processor 12A is shown in greater detail in FIG. 1. The processor 12B may be similar. In the illustrated embodiment, the processor 12A includes a processor core 22 (more briefly referred to herein as a "core") and an interface unit 24. The interface unit 24 includes a memory request buffer 26 and a control unit 28 coupled to the memory request buffer 26. The interface unit 24 is coupled to receive a request address from the core 22 (Req. Addr in FIG. 1) and to provide a snoop address to the core 22 (Snp. Addr in FIG. 1). Additionally, the interface unit 24 is coupled to receive data out and provide data in to the core 22 (Data Out and Data In in FIG. 1, respectively). Additional control signals (Ctl) may also be provided between the core 22 and the interface unit 24. The interface unit 24 is also coupled to communicate address, response, and data phases of transactions on the interconnect 20.

More particularly, in the embodiment of FIG. 1, the interconnect 20 includes address interconnect 30, response interconnect 32, and data interconnect 34. The address phase of transactions is communicated on the address interconnect 30; the response phase of transactions is communicated on the response interconnect 32; and the data phase of transaction is communicated on the data interconnect 34. The address interconnect 30, the response interconnect 32, and the data interconnect 34 may have any structure. For example, the address interconnect 30 and the data interconnect 34 may be buses, in one implementation, and the response interconnect 32 may comprise response lines that are driven by cache-coherent agents responsive to the address phases transmitted on the address bus. Other embodiments may employ any other interconnect (e.g. packet-based interconnects). In still other embodiments, address, response, and data phases may be transmitted as packets on the same physical interconnect. A transaction on the interconnect 20 generally includes a communication from a source on the interconnect 20 to a target on the interconnect 20. A transaction may comprise an address phase to transmit the address of the transaction and a corresponding command and other control information; a data phase to transmit the data of the transaction (if the transaction involves a transfer of data); and a response phase for maintaining flow control and/or cache coherency.

Certain communication on the address interconnect 30, the response interconnect 32, and the data interconnect 34 is illustrated in greater detail in FIG. 1 for one embodiment of the interconnect 20 and the interface unit 24. Other interface circuits for other cache coherent agents may communicate in a similar fashion. In general, an arrow with arrow heads on both ends indicates that the communication shown may be both transmitted and received (e.g. the retry response may be both transmitted and received by the control unit 28). Such communications may be physically communicated on separate communication paths, or a bidirectional communication path, in various embodiments.

The response of a given agent on the interconnect 20 may be a retry response, or may be a coherency response that supplies coherency information to the source (such as the state of the cache block addressed by the transaction in the responding agent, or a state that the source is to assign to the cache block, based on the implemented coherency scheme).

An agent may be any communicator on the interconnect 20 (e.g. the processors 12A-12B, the L2 cache 14, the memory controller 18, and/or the I/O bridge 16). A retry response may be any response that cancels the transaction to which is corresponds. The source of the transaction may reinitiate the transaction at a later time. For example, a retry response may comprise a retry signal that agents may assert. Alternatively, each agent may drive its own retry signal, and the signals may be logically combined by either the source or other circuitry to formulate the retry response. The retry response may be used for flow control, and may also be used for coherency purposes. The retry response is illustrated as "Retry" in FIG. 1, coupled as an input to and an output from the control unit 28 to the response interconnect 32.

More particularly, the control unit 28 in the interface unit 24 may assert a retry response for a transaction if the processor 12A has a previous transaction to the same cache block as the transaction, and the previous transaction is in-progress on the interconnect 20. The previous transaction may have successfully transmitted an address phase (without a retry response in the response phase), and may be awaiting the data phase of the previous transaction. The previous transaction corresponds to a request in the memory request buffer 26, in the illustrated embodiment. Additionally, the interface unit 24 (or more particularly the control unit 28) may provide an identifier of the previous transaction with the retry response. The identifier may be any value that uniquely identifies the previous transaction on the interconnect 20. For example, a transaction identifier (TID) may be associated with each transaction, and the identifier may be the TID of the previous transaction. The source of the retried transaction may capture the TID provided with the retry response (shown as the R_TID on the response interconnect 32), and may monitor for the TID to determine when to reinitiate the transaction. That is, the source may inhibit reinitiating the retried transaction until a second transmission of the TID is detected.

In the illustrated embodiment, the second transmission of the TID may be the data TID (D_TID in FIG. 1) transmitted on the data interconnect 34 when the data phase for the previous transaction is being transmitted on the data interconnect. For example, if the control unit 28 retries a transaction because the processor 12A has a previous transaction in-progress on the interconnect, the interface unit 24 may transmit (for a write transaction) or receive (for a read transaction) the D_TID for the previous transaction. The D_TID may identify the data phase of the transaction on the interconnect 20. Other agents may also receive the D_TID. For example, the agent that initiated the retried transaction may also receive the D_TID and match it to the R_TID provided with the retry response. In other embodiments, the second transmission may be provided in other ways (e.g. transmitted as sideband signals, as another TID on the response interconnect 32, etc.).

Since the R_TID is recorded and reinitiation of the transaction is inhibited until the R_TID is transmitted again, additional retries of the transaction due to the same, in-progress previous transaction may be avoided, in some embodiments. The bandwidth that would otherwise be consumed by the additional transmissions of the address phase of the transaction, only to be retried due to the same previous transaction, may be available for other transactions. Additionally, power may not be consumed since the repeated transmission and repeated retry of address phases may be avoided.

In some embodiments, snoop buffers that store snooped addresses of transactions that are retried may be freed when the retry response is transmitted (or when the retry response is determined and recorded elsewhere, in other embodiments). Snoop buffers may thus be freed earlier, in some embodiments, than if a link to the previous transaction is created to supply data for the transaction instead of retrying. Fewer snoop buffers may be implemented, in some embodiments, for a given performance level.

The interface unit 24 may provide the retry response and R_TID in response to a transaction snooped from the address interconnect 30 (e.g. the Snp. Addr from the address interconnect 30 shown in FIG. 1). It is noted that, in some embodiments, the snoop address may be captured from the address phase of each transaction. In other embodiments, explicit probe transactions may be transmitted. The snoop address or snooped transaction may refer to explicit probe transactions, or to snooping of transactions initiated by other agents, in various embodiments.

Additionally, the interface unit 24 may be the source of a transaction on the address interconnect 30 that is retried by another agent. The control unit 28 is coupled to receive the retry response (as well as to transmit it, as described above) and the corresponding R_TID may be received by the memory request buffer 26. The control unit 28 may cause the memory request buffer 26 to update with the R_TID in the entry that stores the request corresponding to the retried transaction.

The control unit 28 may also be coupled to an arbitration interface to an address arbiter 36 in the illustrated embodiment. For example, the control unit 28 may assert a request signal and a priority of the request to the address arbiter 36, and may receive a grant signal from the address arbiter 36. The address arbiter 36 may assert the grant when the request transmitted by the control unit 28 is determined to be the winner of the arbitration. In the illustrated embodiment, the request may also include the address phase information (e.g. address, command, etc.) corresponding to the requested transaction, and the address arbiter 36 may drive the granted address phase on the address interconnect 30 (Addr Out in FIG. 1). In other embodiments, the address arbiter 36 may arbitrate and assert grants to various agents, but the agents themselves may drive the address interconnect 30. In still other embodiments, distributed arbitration schemes may be used instead of centralized arbitration, or point-to-point interconnect may be used and arbitration may not be implemented.

If a transaction is initiated by the interface unit 24 and is retried, the control unit 28 may inhibit reinitiating the transaction until the R_TID provided with the retry response of the transaction is detected as the D_TID. For example, in the embodiment of FIG. 1, the control unit 28 may inhibit asserting the arbitration request to the address arbiter 36 for the inhibited transaction, although requests for other transactions corresponding to other requests in the memory request buffer 26 may be transmitted to the address arbiter 36.

In some embodiments, the interface unit 24 may increment a retry count responsive to receiving the retry response for a transaction. The retry count may be maintained separately for each request in the memory request buffer 26, or a global retry count may be maintained by the control unit 28 that is updated for any retried transaction corresponding to a request in the memory request buffer 26. The retry count may be used as a starvation-prevention mechanism. If the retry count meets a threshold, the control unit 28 may increase the priority of a retried request when it is presented to the address arbiter 36 for reinitiation. That is, the priority of the retried request may be assigned a higher priority that it otherwise would be assigned, which may increase its chances of being the winner of the arbitration and completing its address phase successfully before other transactions to the same cache block are initiated by other agents. In other embodiments, the retry count may be initialized to a value and decremented. The threshold may be fixed, in some embodiments, or may be programmable in other embodiments. A retry count may "meet" the threshold if it is equal to the threshold, or if it exceeds the threshold. Exceeding the threshold may refer to being numerically greater than the threshold, if the retry count is incremented in response to a retry response, or numerically less than the threshold, if the retry count is decremented in response to a retry response.

An exemplary entry 38 is shown in the memory request buffer 26. Other entries in the memory request buffer may be similar. The entry 38 may also store additional information, as needed, including data, the command for the address phase, etc. In the illustrated embodiment, the entry 38 includes an address field (Addr), an address ordered (AO) bit, a wait (W) bit, an R_TID field, and a retry count (R_CNT) field. The address field stores the address of the request. The address field may be transmitted on the address interconnect 30 when the address phase of the transaction corresponding to the request is transmitted. Additionally, the address field may be compared to the snoop address received from the address interconnect 30 to detect whether or not a retry response is to be asserted by the control unit 28 for a transaction initiated by another agent. The AO bit may be set to indicate that the transaction corresponding to the request has successfully initiated (its address phase has been transmitted on the address interconnect 30, and its response phase has completed without a retry response). The W bit may be set of the address phase of a transaction corresponding to the request receives a retry response, and the R_TID field may be used to store the R_TID provided with the retry response. The W bit may remain set (and prevent arbitration to initiate a transaction for the request) until the R_TID matches a D_TID provided on the data interconnect 34. The R_CNT field may store the retry count for the request, in embodiments in which the retry count is maintained on a per-request (or per-transaction) basis.

Generally, a buffer such as the memory request buffer 26 may comprise any memory structure that is logically viewed as a plurality of entries. In the case of the memory request buffer 26, each entry may store the information for one transaction to be performed on the interconnect 20. In some cases, the memory structure may comprise multiple memory arrays. For example, the memory request buffer 26 may include an address buffer configured to store addresses of requests and a separate data buffer configured to store data corresponding to the request, in some embodiments. An entry in the address buffer and an entry in the data buffer may logically comprise an entry in the memory request buffer 26, even though the address and data buffers may be physically read and written separately, at different times. A combination of one or more memory arrays and clocked storage devices may be used to form a buffer entry, in some embodiments. The address field and the R_TID field of each entry may be implemented as a content addressable memory (CAM), in some embodiments, for comparison to snoop addresses and D_TIDs, respectively.

One or more buffer entries in the memory request buffer 26 may be used as snoop buffer entries, in one embodiment. The control unit 28 may allocate the entries to store snoop addresses and other information (e.g. the snooped command, for example). In other embodiments, a separate snoop buffer from the memory request buffer 26 may be implemented.

Each other agent that may be a source of transactions on the interconnect 20 may include an interface unit similar to the interface unit 24, having a memory request buffer similar to the memory request buffer 26 and a control unit similar to the control unit 28. For example, the processor 12B may include an interface unit 40A, the I/O bridge 16 may include an interface unit 40B, and the L2 cache 14 may include an interface unit 40C. The interface units 40A-40C may be similar to the interface unit 24. The memory controller 18 is also configured to communicate on the interface 20, and may include interface circuitry. However, the memory controller 18 may only be a target of transactions, in one embodiment, and may thus not include all of the functionality described above.

The core 22 generally includes the circuitry that implements instruction processing in the processor 12A, according to the instruction set architecture implemented by the processor 12A. That is, the core 22 may include the circuitry that fetches, decodes, executes, and writes results of the instructions in the instruction set. The core 22 may include one or more caches. In one embodiment, the processors 12A-12B implement the PowerPC™ instruction set architecture. However, other embodiments may implement any instruction set architecture (e.g. MIPS™, SPARC™, x86 (also known as Intel Architecture-32, or IA-32), IA-64, ARM™, etc.).

The interface unit 24 includes the circuitry for interfacing between the core 22 and other components coupled to the interconnect 20, such as the processor 12B, the L2 cache 14, the I/O bridge 16, and the memory controller 18. In the illustrated embodiment, cache coherent communication is supported on the interconnect 20 via the address, response, and data phases of transactions on the interconnect 20. The order of successful (non-retried) address phases on the interconnect 20 may establish the order of transactions for coherency purposes. Generally, the coherency state for a cache block may define the permissible operations that the caching agent may perform on the cache block (e.g. reads, writes, etc.). Common coherency state schemes include the modified, exclusive, shared, invalid (MESI) scheme, the MOESI scheme which includes an owned state in addition to the MESI states, and variations on these schemes.

In some embodiments, the interconnect 20 may support separate address and data arbitration among the agents, permitting data phases of transactions to occur out of order with respect to the corresponding address phases. Other embodiments may have in-order data phases with respect to the corresponding address phase. In one implementation, the address phase may comprise an address packet that includes the address, command, and other control information. The address packet may be transmitted in one bus clock cycle, in one embodiment. In one implementation, the data interconnect may comprise a limited crossbar in which data bus segments are selectively coupled to drive the data from data source to data sink.

The core 22 may generate various requests. Generally, a core request may comprise any communication request generated by the core 22 for transmission as a transaction on the interconnect 20. Core requests may be generated, e.g., for load/store instructions that miss in the data cache (to retrieve the missing cache block from memory), for fetch requests that miss in the instruction cache (to retrieve the missing cache block from memory), uncacheable load/store requests, writebacks of cache blocks that have been evicted from the data cache, etc. The interface unit 24 may receive the request address and other request information from the core 22, and corresponding request data for write requests (Data Out). For read requests, the interface unit 24 may supply the data (Data In) in response to receiving the data from the interconnect 20.

The L2 cache 14 may be an external level 2 cache, where the data and instruction caches in the core 22, if provided, are level 1 (L1) caches. In one implementation, the L2 cache 14 may be a victim cache for cache blocks evicted from the L1 caches. The L2 cache 14 may have any construction (e.g. direct mapped, set associative, etc.).

The I/O bridge 16 may be a bridge to various I/O devices or interfaces (not shown in FIG. 1). Generally, the I/O bridge 16 may be configured to receive transactions from the I/O devices or interfaces and to generate corresponding transactions on the interconnect 20. Similarly, the I/O bridge 16 may receive transactions on the interconnect 20 that are to be delivered to the I/O devices or interfaces, and may generate corresponding transactions to the I/O device/interface. In some embodiments, the I/O bridge 16 may also include direct memory access (DMA) functionality.

The memory controller 18 may be configured to manage a main memory system (not shown in FIG. 1). The memory in the main memory system may comprise any desired type of memory. For example, various types of dynamic random access memory (DRAM) such as synchronous DRAM (SDRAM), double data rate (DDR) SDRAM, etc. may form the main memory system. The processors 12A-12B may generally fetch instructions from the main memory system, and may operate on data stored in the main memory system. I/O devices may use the main memory system to communicate with the processors 12A-12B (e.g. via DMA operations or individual read/write transactions).

FIGS. 2-5 are flowcharts illustrating operation of one embodiment of the interface unit 24, and more particularly the control unit 28, at various points in the processing of requests in the memory request buffer 26 and transactions on the interconnect 20. The blocks in each flowchart are shown in an order for ease of understanding. However, other orders may be used. Furthermore, blocks may be implemented in parallel in combinatorial logic in the interface unit 24/control unit 28. Blocks, combinations of blocks, or the flowcharts as a whole may be pipelined over multiple clock cycles.

Figure 2:
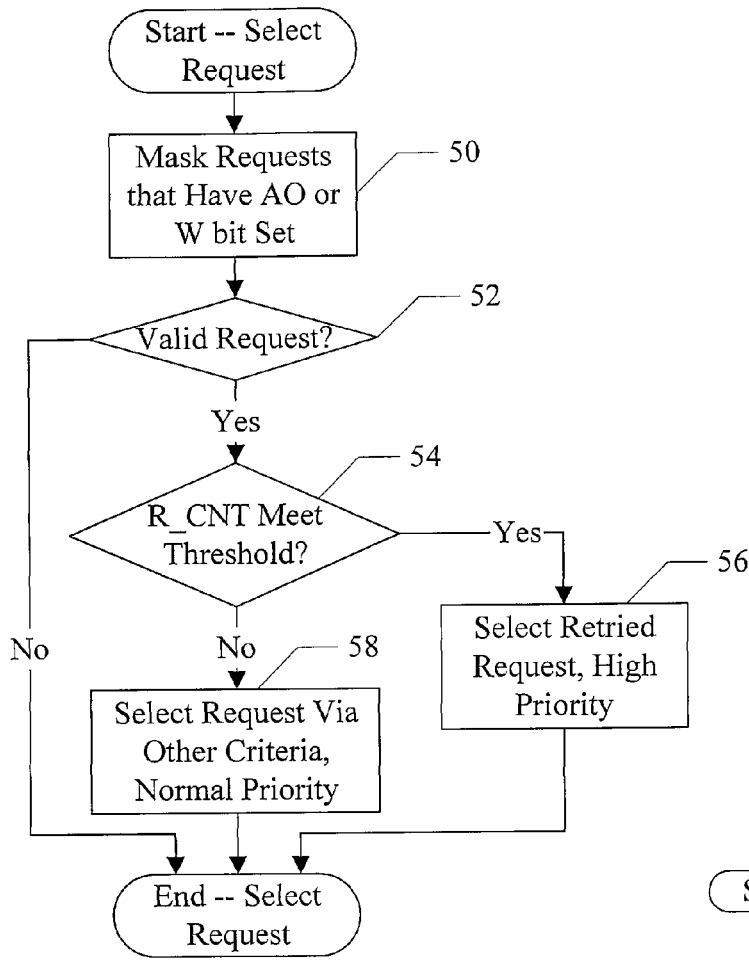
FIG. 2 is a flowchart illustrating operation of one embodiment of an interface unit shown in FIG. 1 to select a request for transmission on an interconnect.

Turning now to FIG. 2, a flowchart is shown illustrating operation of one embodiment of the interface unit 24 (and more particularly the control unit 28) for one embodiment of selecting a request to transmit as a transaction to request the address arbiter 36.

The control unit 28 may mask those requests in buffer entries in the memory request buffer 26 that have either the AO bit or the W bit set (block 50). Requests having the AO bit set have been successfully initiated on the interconnect 20 and were not retried during their response phases. Accordingly, such requests are not selected for arbitration. Requests having the W bit set are waiting for a match on the R_TID stored in the entry, and thus are not eligible for selection currently. If there is no valid request remaining in the memory request buffer 26 after the masking, then no requests are selected (decision block 52, "no" leg). On the other hand, if at least one valid request remains after the masking (decision block 52, "yes" leg), a request may be selected. In some embodiments, other criteria may affect whether or not any request is selected. For example, in embodiments in which the address arbiter 36 transmits the address phase on the address interconnect 30, the address arbiter 36 may implement buffering to store the address phase information. For example, two buffer entries per agent may be provided (although more or fewer buffer entries may be provided in other embodiments). If no buffer entry is available in the address arbiter 36 to store the address phase information, then no request may be selected.

If the retry count (R_CNT) meets the threshold (decision block 54, "yes" leg), the control unit 28 may select the retried request and may increase the priority of the arbitration request to a higher priority than normal for the request (block 56). In embodiments in which each memory request buffer entry has a retry count, the retried request that is selected is the request corresponding to the retry count. If a global retry count is used, the oldest request that has been retried may be selected. Alternatively, the oldest request in the memory request buffer 26, or the oldest request of the highest priority that is in the memory request buffer 26, may be selected. If the R_CNT does not meet the threshold (decision block 54, "no" leg), the control unit 28 may select a request according to other criteria (block 58). For example, criteria may include age in the buffer, priority, a combination of age and priority, etc. The priority level transmitted to the address arbiter 36 in this case may be the normal priority level for the request, in this case.

Figure 3:
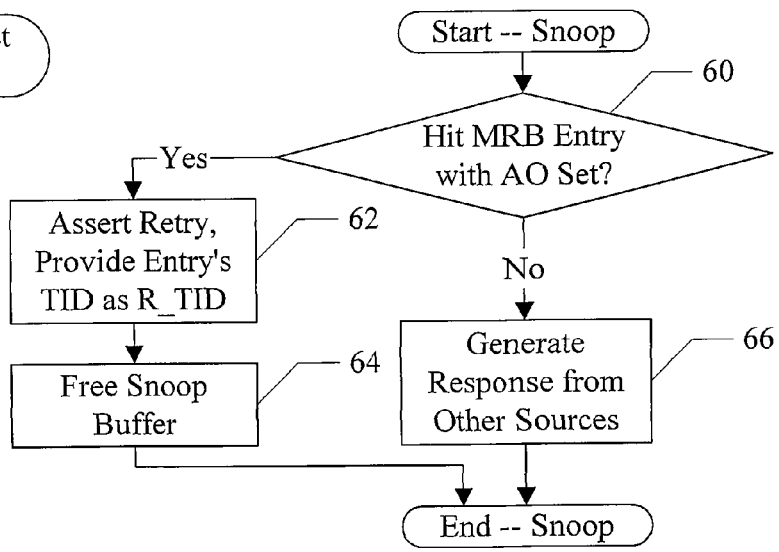
FIG. 3 is a flowchart illustrating operation of one embodiment of an interface unit shown in FIG. 1 during a snoop.

Turning next to FIG. 3, a flowchart is shown illustrating operation of one embodiment of the interface unit 24 (and more particularly the control unit 28) for one embodiment of responding to a snooped address phase from the address interconnect 30. The address, command, and other address phase information may be stored into a memory request buffer entry allocated to store snoops, or may be stored in a separate set of snoop buffers, in various embodiments.

If the snoop hits a memory request buffer (MRB) entry that has the AO bit set (that is, the transaction for the request in that entry is in-progress—decision block 60, "yes" leg), the control unit 28 may assert the retry response in the response phase of the snooped transaction and provide the TID of the entry as the R_TID with the retry response (block 62). The response phase may occur on a different clock cycle than the snoop, and thus the retry response and providing the R_TID may be pipelined by one or more clock cycles. The snoop buffer storing the snoop may also be freed, either when the retry response is provided or when the control unit 28 has recorded the retry response and R_TID for later transmission, in various embodiments (block 64). In some embodiments, the control unit 28 may generate the R_TID. For example, the TID may be a combination of a value that identifies the processor 12A on the interconnect and a value that identifies the buffer entry storing the request. In such cases, the entry that is hit by the snoop indicates the R_TID to be generated. In other cases, the TID may be assigned to the request and may be stored in the memory request buffer entry, and the memory request buffer 26 the TID may be forwarded as the R_TID with a retry response.

If the snoop does not hit an MRB entry that has the AO bit set (decision block 60, "no" leg), the control unit 28 may generate the snoop response from other sources (block 66). For example, the interface unit 24 may have a duplicate set of cache tags for one or more caches in the core 22, and may determine the snoop response from the cache tags. The snoop buffer entry may or may not be freed in the case than no MRB entry is hit, since other actions may be taken (e.g. state changes in the cache or caches, writeback of a cache block from the cache(s), etc.). The snoop address may be forwarded to the core 22 to take some actions, as illustrated in FIG. 1.

It is noted that a snoop hit in the MRB entry may refer to the snoop address matching the address in the buffer entry at the granularity for which cache coherency is maintained (e.g. at the cache block granularity or other granularity, in various embodiments).

Figure 4:
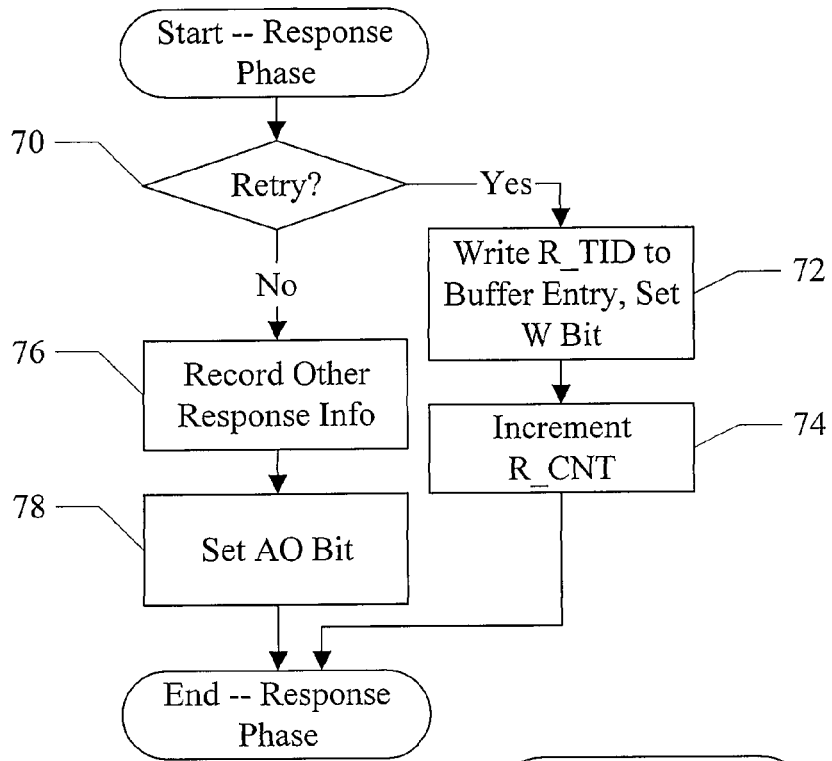
FIG. 4 is a flowchart illustrating operation of one embodiment of an interface unit shown in FIG. 1 during the response phase of a transaction.

Turning next to FIG. 4, a flowchart is shown illustrating operation of one embodiment of the interface unit 24 (and more particularly the control unit 28) for one embodiment during the response phase of a transaction initiated by the interface unit 24.

If the response to the transaction is the retry response (decision block 70, "yes" leg), the control unit 28 may cause the memory request buffer 26 to write the R_TID provided with the retry response to the buffer entry of the request for which the transaction was initiated, and may set the W bit in that entry (block 72). Additionally, the control unit 28 may increment the R_CNT (block 74). If the response to the transaction is not the retry response (decision block 70, "no" leg), the control unit 28 may record any other response information, if any (e.g. the state in which the cache block is to be cached, for a read—block 76), and may set the AO bit for the entry (block 78).

Figure 5:
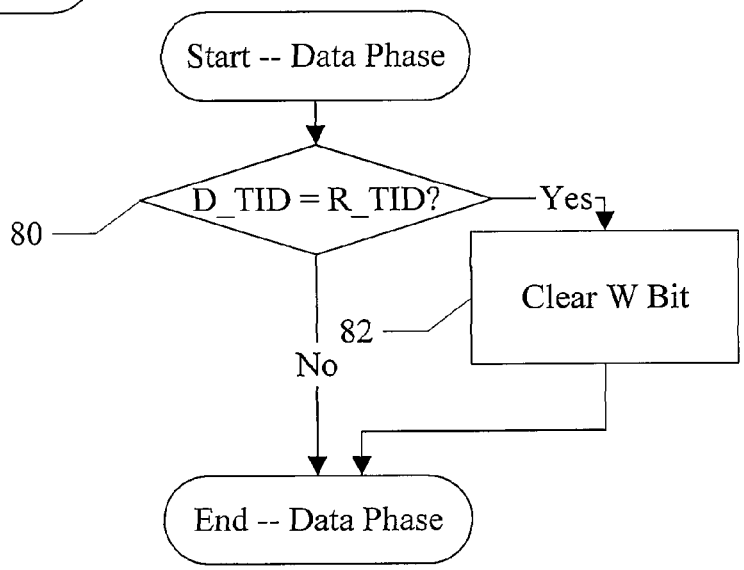
FIG. 5 is a flowchart illustrating operation of one embodiment of an interface unit shown in FIG. 1 during a data phase of a transaction.

FIG. 5 is a flowchart illustrating operation of one embodiment of the interface unit 24 (and more particularly the control unit 28) for one embodiment during the data phase of a transaction initiated by another agent. The control unit 28 may compare the D_TID from the data interconnect 34 to the R_TIDs in the memory request buffer 26. If the D_TID matches an R_TID in a entry or entries (decision block 80, "yes" leg), the control unit 28 may clear the W bit in the entry or entries (block 82).

Numerous variations and modifications will become apparent to those skilled in the art once the above disclosure is fully appreciated. It is intended that the following claims be interpreted to embrace all such variations and modifications.

What is claimed is:

1. An interface unit comprising:
   a buffer configured to store requests that are to be transmitted on an interconnect, wherein each request comprises an address accessed by the request; and
   a control unit coupled to the buffer;
   the buffer is coupled to receive a first address corresponding to a first transaction on the interconnect, the first transaction transmitted by another source on the interconnect, and wherein the buffer is configured to compare the first address to addresses stored in the buffer; and
   the control unit is configured to assert a retry response during a response phase of the first transaction on the interconnect responsive to the first address matching a second address in the buffer for which a second transaction initiated by the interface unit is in progress on the interconnect, and wherein the control unit is further configured to provide a retry identifier of the second transaction with the retry response to the source.

2. The interface unit as recited in claim 1 further configured to transmit a data identifier in the data phase of the second transaction, wherein the data identifier is equal to the retry identifier.

3. The interface unit as recited in claim 1 wherein the control unit is further configured to free a buffer entry in the buffer that is storing a snoop operation corresponding to the first transaction responsive to asserting the retry response on the interconnect.

4. The interface unit as recited in claim 1 wherein the control unit is configured to determine a response to be transmitted in the response phase of the first transaction from other sources if the retry response is not generated for a hit on the second address in the buffer.

5. A method comprising:
   receiving a first address corresponding to a first transaction on an interconnect into an interface unit coupled to the interconnect, the first transaction transmitted by another source on the interconnect, wherein the interface unit includes a buffer configured to store requests that are to be transmitted on the interconnect, wherein each request comprises an address accessed by the request;
   the interface unit detecting a match between the first address and a second address in the buffer for which a second transaction is in progress on the interconnect; and
   the interface unit asserting a retry response during a response phase of the first transaction and transmitting a retry identifier with the retry response that identifies the second transaction on the interconnect.

6. The method as recited in claim 5 further comprising the interface unit transmitting a data identifier on the interconnect in the data phase of the second transaction, wherein the data identifier is equal to the retry identifier.

7. The method as recited in claim 5 further comprising the interface unit:
snooping the first transaction from the interconnect;
allocating a buffer entry to the first transaction in response to the snooping; and
freeing the buffer responsive to asserting the retry response on the interconnect.

8. The method as recited in claim 5 further comprising the interface unit:
receiving a third address corresponding to a third transaction on the interconnect, the third transaction transmitted by another source on the interconnect;
detecting no match between the third address and addresses in the buffer for which corresponding transactions are in progress on the interconnect; and
determining a response to be transmitted in the response phase of the third transaction from other sources within a processor that includes the interface unit, the determining responsive to detecting no match in the buffer.

9. A processor comprising:
a processor core configured to source one or more requests to be transmitted on an interconnect; and
an interface unit coupled to the processor core and the interconnect, wherein the interface unit is configured to snoop a first transaction from the interconnect, detect a snoop hit of the first transaction on a second transaction previously initiated by the interface unit on the interconnect and that is in progress on the interconnect, assert a retry response for the first transaction during a response phase of the first transaction, and transmit a retry identifier on the interconnect with the retry response, wherein the retry identifier identifies the second transaction.

10. The processor as recited in claim 9 wherein the interface unit is further configured to initiate a third transaction on the interconnect that corresponds to a request from the processor core, and wherein the interface unit is configured to receive a retry response from the interconnect during a response phase of the third transaction on the interconnect, and wherein the interface unit is configured to record a second retry identifier received with the retry response for the third transaction.

11. The processor as recited in claim 10 wherein the interface unit is further configured to inhibit reinitiating the third transaction on the interconnect until detecting a third identifier on the interconnect that matches the second retry identifier.

12. The processor as recited in claim 11 wherein the third identifier is a data identifier transmitting during a data phase of a fourth transaction identified by the second retry identifier.

13. The processor as recited in claim 9 wherein the interface unit is further configured to transmit a data identifier in the data phase of the second transaction, wherein the data identifier is equal to the retry identifier.

14. The processor as recited in claim 9 wherein the interface unit is further configured to free a buffer entry that is storing a snoop operation corresponding to the first transaction responsive to asserting the retry response on the interconnect.

15. The processor as recited in claim 9 wherein the core comprises at least one cache, and wherein the interface unit is configured to determine a response to be transmitted in the response phase of the first transaction from a snoop in the cache.

16. A system comprising:
an interconnect;
a first processor coupled to the interconnect and configured to initiate a first transaction on the interconnect; and
a second processor coupled to the interconnect and configured to initiate a second transaction on the interconnect subsequent to the first transaction and while the first transaction is in progress on the interconnect;
wherein the first processor is configured to detect a snoop hit of the second transaction on the first transaction, and wherein the first processor is configured to transmit a retry response and a retry identifier identifying the first transaction on the interconnect during a response phase of the second transaction in response to detecting the snoop hit; and
wherein the second processor is configured to record the retry identifier and to inhibit reinitiating the second transaction on the interconnect until detecting a data identifier on the interconnect in a data phase of the first transaction, wherein the data identifier matches the retry identifier.

17. The system as recited in claim 16 further comprising a memory controller coupled to the interconnect, wherein the memory controller is a target of the first transaction, wherein the first transaction is a read transaction, and wherein the memory controller is configured to transmit the data identifier on the interconnect to initiate the data phase of the transaction.

18. The system as recited in claim 16 further comprising a memory controller coupled to the interconnect, wherein the memory controller is a target of the first transaction, wherein the first transaction is a write transaction, and wherein the first processor is configured to transmit the data identifier.

* * * * *